(12) United States Patent
Fukushima et al.

(10) Patent No.: US 6,474,715 B2
(45) Date of Patent: Nov. 5, 2002

(54) STRUCTURE FOR REAR LUGGAGE COMPARTMENT OF VEHICLE

(75) Inventors: Yoshio Fukushima; Toshinori Sakamoto, both of Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/855,758

(22) Filed: May 16, 2001

(65) Prior Publication Data

US 2001/0052712 A1 Dec. 20, 2001

(30) Foreign Application Priority Data

May 16, 2000 (JP) ........................................ 2000-143897
May 16, 2000 (JP) ........................................ 2000-143898

(51) Int. Cl.$^7$ ............................................. B60R 11/06
(52) U.S. Cl. ...................... 296/37.1; 296/37.6; 296/37.2
(58) Field of Search ............................... 296/37.1, 37.6, 296/37.16, 24.1, 37.2, 146.8, 37.5, 37.8, 100.06, 106, 195, 37.14, 37.3; 280/124.1

(56) References Cited

U.S. PATENT DOCUMENTS

| | | | | |
|---|---|---|---|---|
| 2,091,070 A | * | 8/1937 | Girl .......................... | 296/37.1 |
| 2,784,027 A | * | 3/1957 | Temp ........................ | 296/37.6 |
| 3,032,217 A | * | 5/1962 | Musson et al. ............ | 296/37.6 |
| 3,287,058 A | * | 11/1966 | Wells ....................... | 296/37.14 |
| 3,999,963 A | * | 12/1976 | Cooper, Sr. ............... | 296/37.1 |
| 4,410,201 A | * | 10/1983 | Iijima et al. .............. | 280/124.1 |
| 4,469,364 A | * | 9/1984 | Rafi-Zadeh ................ | 296/37.6 |
| 4,733,898 A | * | 3/1988 | Williams ................... | 296/37.6 |
| 4,991,898 A | * | 2/1991 | Nomura ..................... | 296/37.2 |
| 5,150,939 A | * | 9/1992 | Simin ....................... | 296/37.1 |
| 5,167,433 A | * | 12/1992 | Ryan ......................... | 296/37.1 |
| 5,797,642 A | * | 8/1998 | Takanishi et al. .......... | 296/37.1 |
| 5,799,845 A | * | 9/1998 | Matsushita ................. | 296/37.2 |
| 5,979,962 A | * | 11/1999 | Valentin et al. ............ | 296/37.1 |
| 6,003,921 A | * | 12/1999 | Tozuka ...................... | 296/37.2 |
| 6,033,003 A | * | 3/2000 | Bell et al. .................. | 296/37.3 |
| 6,155,625 A | * | 12/2000 | Felix .......................... | 296/37.1 |
| 6,247,741 B1 | * | 6/2001 | Seel et al. .................. | 296/37.2 |
| 6,290,277 B1 | * | 9/2001 | Spykerman et al. ....... | 296/37.5 |
| 6,318,782 B1 | * | 11/2001 | Suzuki et al. .............. | 296/37.1 |
| 6,322,123 B1 | * | 11/2001 | Garrison et al. ........... | 296/37.1 |
| 6,328,366 B1 | * | 12/2001 | Foster et al. ............... | 296/37.2 |
| 6,336,671 B1 | * | 1/2002 | Leonardi .................... | 296/37.2 |
| 6,338,518 B1 | * | 1/2002 | D'Annunzio et al. ...... | 296/37.8 |
| 2001/0022450 A1 | * | 9/2001 | Delavalle et al. .......... | 296/37.1 |
| 2001/0040382 A1 | * | 11/2001 | Nemoto ..................... | 296/37.14 |

FOREIGN PATENT DOCUMENTS

| | | | |
|---|---|---|---|
| DE | 33324081 A1 | * | 11/1985 |
| DE | 4140508 A1 | * | 6/1993 |
| JP | 6124639 | * | 2/1986 |
| JP | 6175036 | * | 4/1986 |
| JP | 6-6106 U | | 1/1994 |

* cited by examiner

*Primary Examiner*—Kiran Patel
(74) *Attorney, Agent, or Firm*—Nixon Peabody LLP; Donald R. Studebaker

(57) ABSTRACT

A rear luggage compartment structure for a vehicle body is disclosed. A rear luggage compartment is provided by rear part of a floor panel of a vehicle body depressed downward at the rear part of the vehicle body. The rear luggage compartment structure includes a trunk case which is locked in a position where the trunk case is received in the rear luggage compartment and unlocked so as to be pulled out of the rear luggage compartment for access thereto below the rear bumper.

15 Claims, 8 Drawing Sheets

STRUCTURE FOR REAR LUGGAGE COMPARTMENT OF VEHICLE

BACKGROUND OF THE INVENTION

1. Field of the Invention

The present invention relates to a luggage compartment structure for vehicles, and, more particularly, to a structure for a luggage compartment located behind a rear seats in an automobile that is one of typical vehicles.

2. Description of Related Art

In the field of automotive vehicles that are one of typical vehicles, structural designs of vehicle bodies have been proposed for the purpose of accomplishing a comfortable environment for passengers in a limited dwelling space of an automotive vehicle body and also for the purpose of realizing efficient luggage storage for various luggage. In one of examples of the structural designs, a tray for luggage storage is provided below a luggage compartment located at rear part of a wagon-type vehicle so as to be accessible from behind the vehicle body. Such a vehicle body structure is known from, for example, Japanese Laid Open Utility Model Publication No. 6-6106.

However, the prior art rear luggage storage tray is constructed as an integral part with port f the rear bumper of the vehicle, so that the structural rigidity of the vehicle body is diminished. This possibly provides the vehicle body with aggravation of safety.

In addition, the prior art rear luggage storage tray limits access thereto to a position behind the vehicle body. The vehicle body has the same luggage storage capacity of the rear luggage compartment in spite of employing the luggage storage tray or not. Therefore, the height of luggage that can be stored in the rear luggage compartment is limited by the vertical distance between a floor and a roof of the vehicle body at the rear part of the vehicle body. For example, there is a constraint on storing bulky luggage such as a potted plant that is undesirable to be put in the luggage compartment in a laying position.

SUMMARY OF THE INVENTION

It is therefore an objective of the present invention to provide a rear luggage compartment structure for vehicle bodies, which provides superior vehicle structural rigidity of the vehicle body and a superior luggage storage capability.

It is another object of the present invention to provide a rear luggage compartment structure for vehicle bodies, which has a superior luggage storage capacity and is capable of storing bulky luggage therein without putting it in a laying position.

The above objects of the present invention is achieved by a rear luggage compartment structure for a vehicle having a rear bumper. The rear luggage compartment is provided by a rear section of a floor panel partly depressed downward. The luggage compartment is provided with an opening and closing structure for access to the luggage compartment from the exterior of the vehicle body under the rear bumper.

In accordance with a preferred embodiment of the present invention, the rear luggage compartment structure includes a bumper reinforcement which is disposed on an inside of an outer shell of the rear bumper and extends in a transverse direction of the vehicle body and under which the opening and closing structure of the rear luggage compartment is located. Further, the depressed part of the floor panel may be covered with, for example, a cover member as an opening and closing structure. This opening and closing structure allows the vehicle body with two luggage compartments on the bottom of the depressed part of the floor panel while the cover member is closed.

In any structures, the rear luggage compartment is provided with a luggage storage component such as a storage case and a storage tray that is separate from the vehicle body. This luggage storage component may be able to slid back and forth in a lengthwise direction of the vehicle body so as to received in and pulled out of the rear luggage compartment due to the opening and closing structure. In this instance, the luggage storage component preferably has a rear end in the lengthwise direction of the vehicle body that is exposed to the exterior of the vehicle body and is even and continuous with the outer shell of the rear bumper while it is received in the rear luggage compartment.

Further, in accordance with another preferred embodiment, the opening and closing structure of the rear luggage compartment comprises a luggage storage component that is separate from the vehicle body and can slid back and forth in the lengthwise direction; a first lock/unlock mechanism that unlocks the luggage storage component to allow slide movement of the luggage storage component through a specified distance in the lengthwise direction and locks the luggage storage component for access to prohibit the slide movement of the luggage storage component through the specified distance, and a second lock/unlock mechanism that locks the luggage storage component in an access position where the luggage storage component is accessed and unlocks the luggage storage component to allow further slide movement of the luggage storage component toward the back of the vehicle body from the access position.

In this case, the first lock/unlock mechanism may include remote control means for remotely causing the first lock/unlock mechanism to unlock the luggage storage component. The second lock/unlock mechanism may be preferably manually operated to unlock the luggage storage component.

Further, in any cases, the first lock/unlock mechanism may include urging means for urging the luggage storage component backward while it is received in the rear luggage compartment and locked.

In accordance with still another preferred embodiment of the present invention, the rear luggage compartment structure has a first rear luggage compartment over rear part of a floor panel of a vehicle body, a generally box-shaped second rear luggage compartment which is formed below the first rear luggage compartment by rear part of a floor panel depressed downward, and a generally box-shaped trunk case received in said generally box-shaped second rear luggage compartment which is accessible from the first rear luggage compartment for removal from the second rear luggage compartment.

The generally box-shaped second rear luggage compartment is preferably positioned in the same vertical height from the ground as the rear bumper disposed at the back of the vehicle body. The rear luggage compartment structure may further comprises a bumper reinforcement disposed on a front side of the outer shell of the rear bumper in the lengthwise direction and a rear end frame disposed between the bumper reinforcement and the generally box-shaped trunk case. The rear end frame extends in the transverse direction and has a cross section closed in the lengthwise direction.

In any s rear luggage compartment structures, a third rear luggage compartment may be formed between the said generally box-shaped trunk case received in the second rear luggage compartment and the rear part of said floor panel depressed downward. The third rear luggage compartment is capable of opening so as to allow external access thereto from the back of the vehicle body.

The present invention can accomplish the rear luggage compartment structure for vehicle bodies, which has superior body rigidity and superior luggage storage capability. Specifically, because the rear luggage compartment is accessible from below the rear bumper, both structural rigidity and storage capability of the rear luggage compartment of the vehicle body are realized without employing divided structure of rear bumper. In addition, because the rear luggage compartment is accessible at a vertical position lower than general rear luggage compartments which are situated over a floor mat, the convenience of loading luggage is improved.

In the case the rear luggage compartment structure of the present invention is installed in a wagon type vehicle bodies, the double-stories luggage compartment structure which provides a rear luggage compartment over a floor mat which is continuous with a passenger compartment and a luggage compartment below the floor mat realizes multifarious storage-forms of luggage depending upon preference of users. This rear luggage compartment structure provides the users with a better feeling of design.

The rear luggage compartment structure is devised so that the first lock/unlock mechanism is remotely operated to unlock the trunk case and the second lock/unlock mechanism locking the trunk case is manually operated to unlock the trunk case, as a result of which, the operability and safety of the trunk case. Moreover, when the first lock/unlock mechanism is operated to unlock the trunk case, it forces the trunk case rearward to open the trunk case, so that the operability can be further enhanced.

The present invention can further accomplish the rear luggage compartment structure for vehicle bodies, which provides a rear luggage compartment capable of storing bulky luggage therein without putting it in a laying position. Specifically, the rear luggage compartment structure increases the storage capacity of the rear luggage compartment by providing a second rear luggage compartment. Furthermore, even though the rear luggage compartment structure employs a floor panel that is partly depressed, it prevents the vehicle body from encountering a decrease in structural rigidity by using a removable trunk case received in the second rear luggage compartment since external impact applied to the depressed part of the floor panel is sustained by the trunk case. Furthermore, the rear luggage compartment structure with the trunk case remaining removed provides a deep storage area in the rear luggage compartment by the depressed part of the floor panel, so that it makes it possible to store bulky luggage without putting it in a laying position. This improves the storage convenience of the rear luggage compartment. The rear luggage compartment structure places the trunk case even in the vertical height from the ground with the rear bumper. The trunk case sustains external impact applied to the rear bumper and absorbs it and transmits it partly to the vehicle body therethrough. This provides an increase in impact absorbing capability.

The rear luggage compartment structure includes a bumper reinforcement and a rear end frame disposed between the bumper reinforcement and the trunk case. This rear compartment structure transmits external impact applied to the rear bumper to the bumper reinforcement, the rear end frame and the trunk case in steps, so as to effectively absorb the external impact to the vehicle body. This provides safety of the passenger upon an occurrence of a rear crash due to increased impact absorbing capability.

In the case where the structure has a third rear luggage compartment, it provides multifarious storage-forms of luggage depending upon preference of users and convenient access to luggage without opening a lift gate.

BRIEF DESCRIPTION OF THE DRAWINGS

The foregoing and other objects and features of the present invention will become more apparent from the following detailed description in connection with preferred embodiments thereof when considered in connection with the accompanying drawings, in which:

FIG. 8 is a plan view showing an example of a lock/unlock mechanism that is installed to a front end of the lower trunk case; and.

DESCRIPTION OF THE PREFERRED EMBODIMENTS

Figure 1:
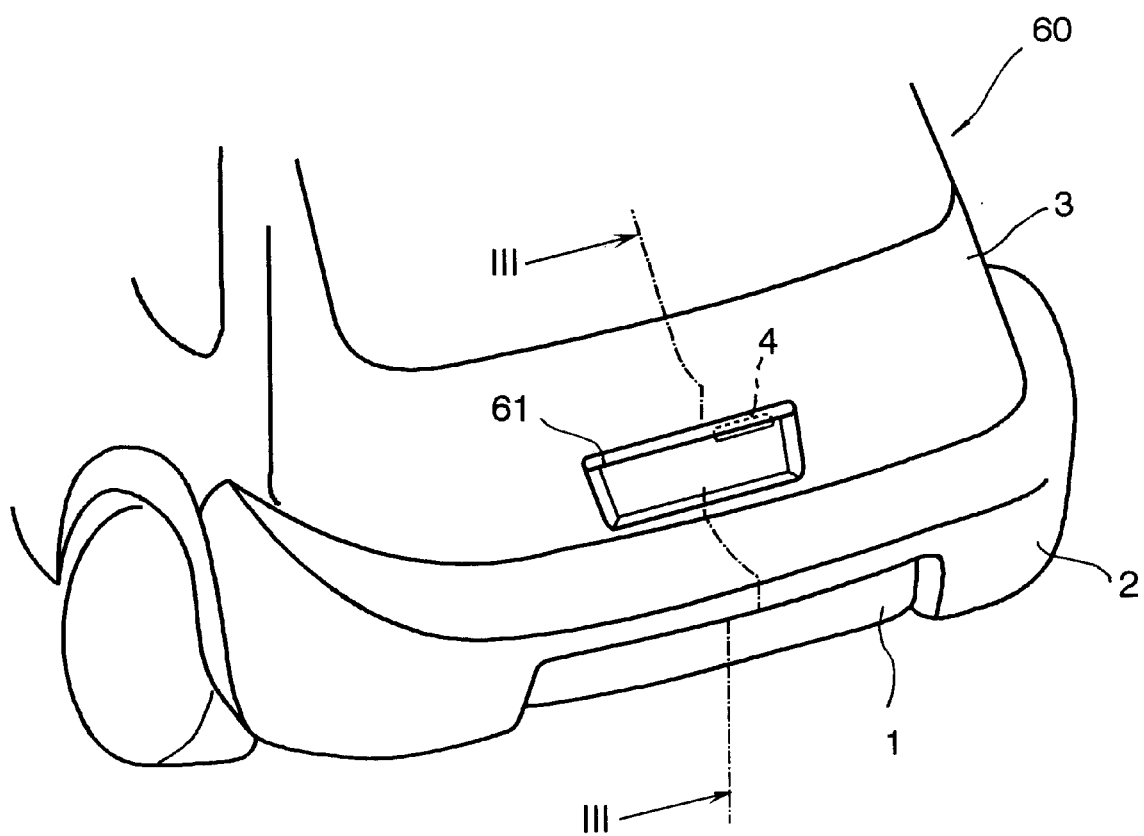
FIG. 1 is a perspective view showing rear part of a vehicle body in which a rear luggage compartment structure according to an embodiment of the present invention is employed.

Referring to the drawings in detail, and in particular to FIG. 1 which shows rear part of a vehicle body 60 equipped with a rear luggage compartment structure according to a preferred embodiment of the present invention, the vehicle body 60 is provided with a rear bumper 2 that extends in a transverse direction of vehicle body 60 at the rear end of the vehicle body 60. A lower trunk case 1, which forms a rear luggage storage component capable of being pulled out or opened and pushed in or closed, has a rear end that is exposed to the outside of the vehicle body 60 below a rear bumper 2. The rear end of the lower trunk case 1 forms a part continuous with an outer shell 21 (see FIG. 3) of the rear bumper 2 while the lower trunk case 1 is fully closed or pushed in. This configuration provides peoples with a better feeling of design.

The vehicle body 60 is provided with a lift gate 3 located above the rear bumper 2. The lift gate 3 is installed to the vehicle body 60 by a support (not shown) so as to open and close. In addition, a lock/unlock knob 4 (not shown) is provided at an upper inside of a license plate housing 61 situated on the lift gate 3.

Figure 2:
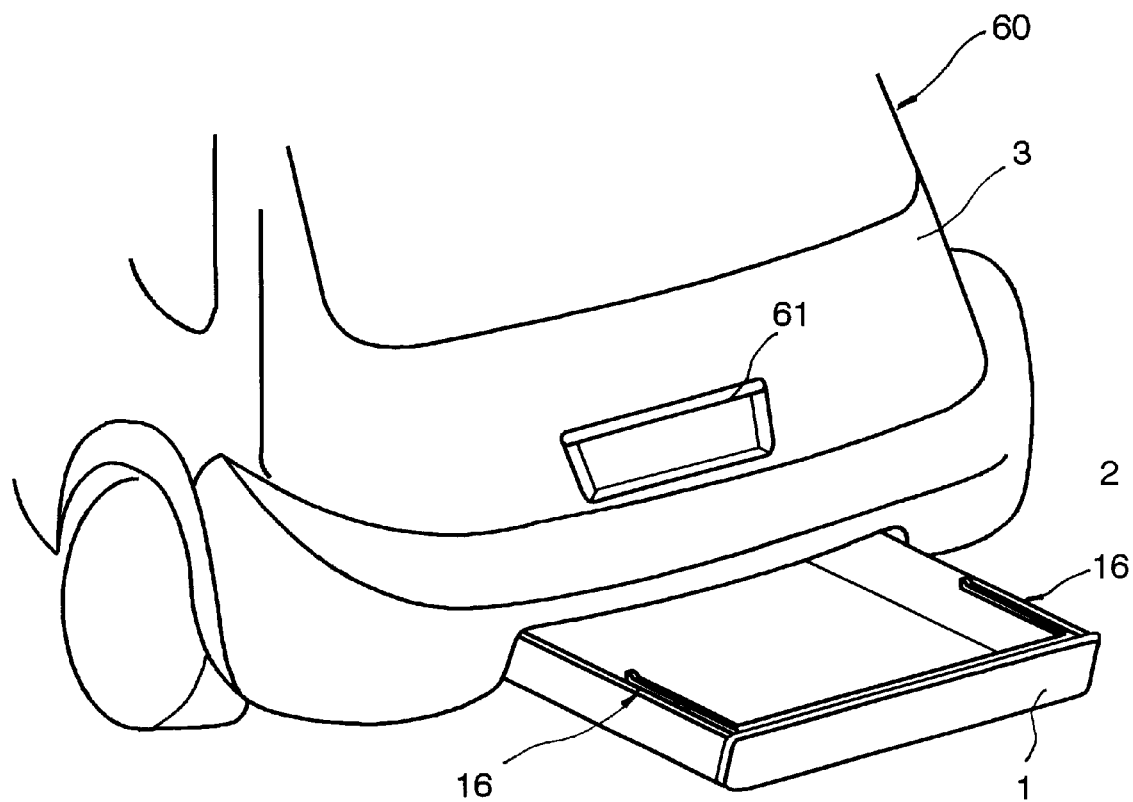
FIG. 2 is a perspective view showing the rear part of the vehicle body shown in FIG. 1 in which a lower trunk case is pulled out.

FIG. 2 shows the rear part of the vehicle body 60 with the lower trunk case 1 opened or pulled out. As shown, the lower trunk case 1 can slid in the lengthwise direction of the vehicle body 60 through a mechanism which will be described later.

Figure 3:
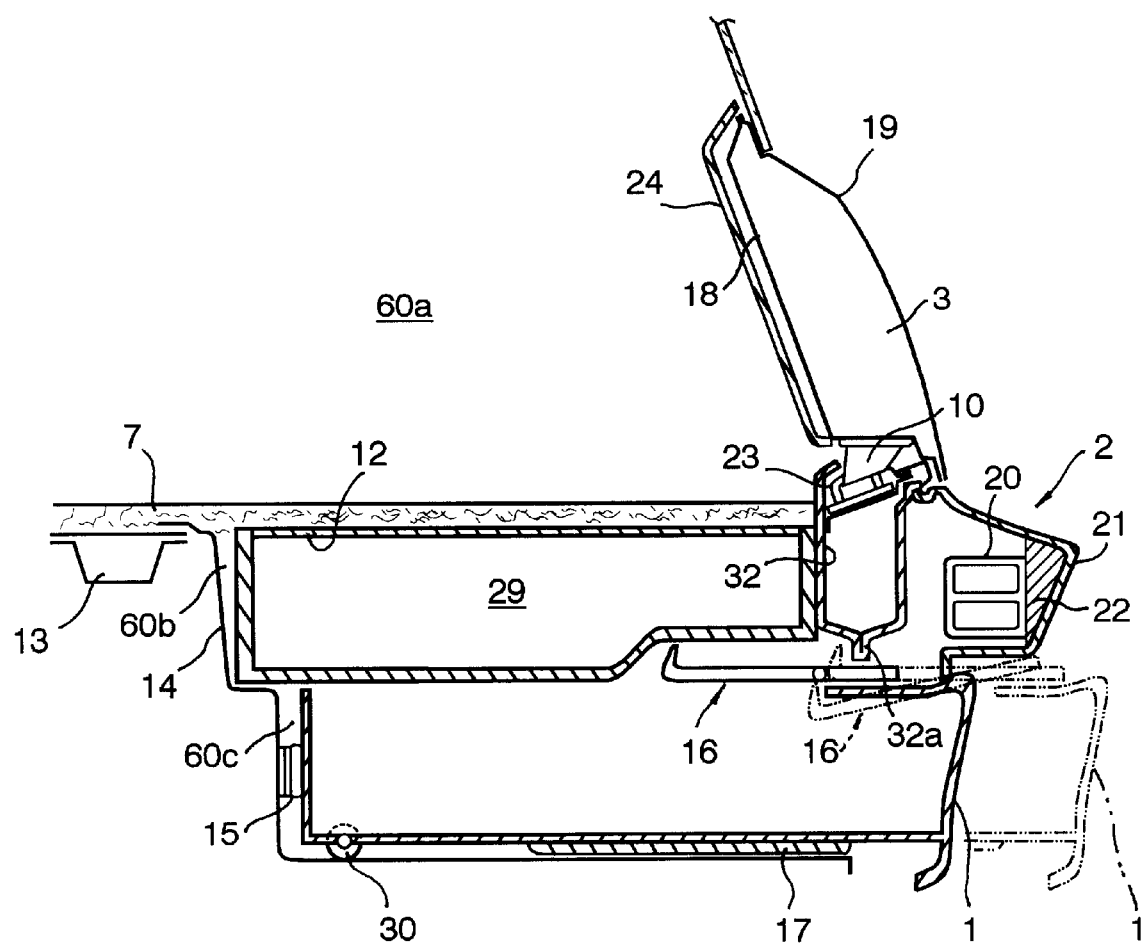
FIG. 3 is a cross-sectional view taken along a line III—III in FIG. 1 showing a substantial part of the rear luggage compartment structure.
Figure 4:
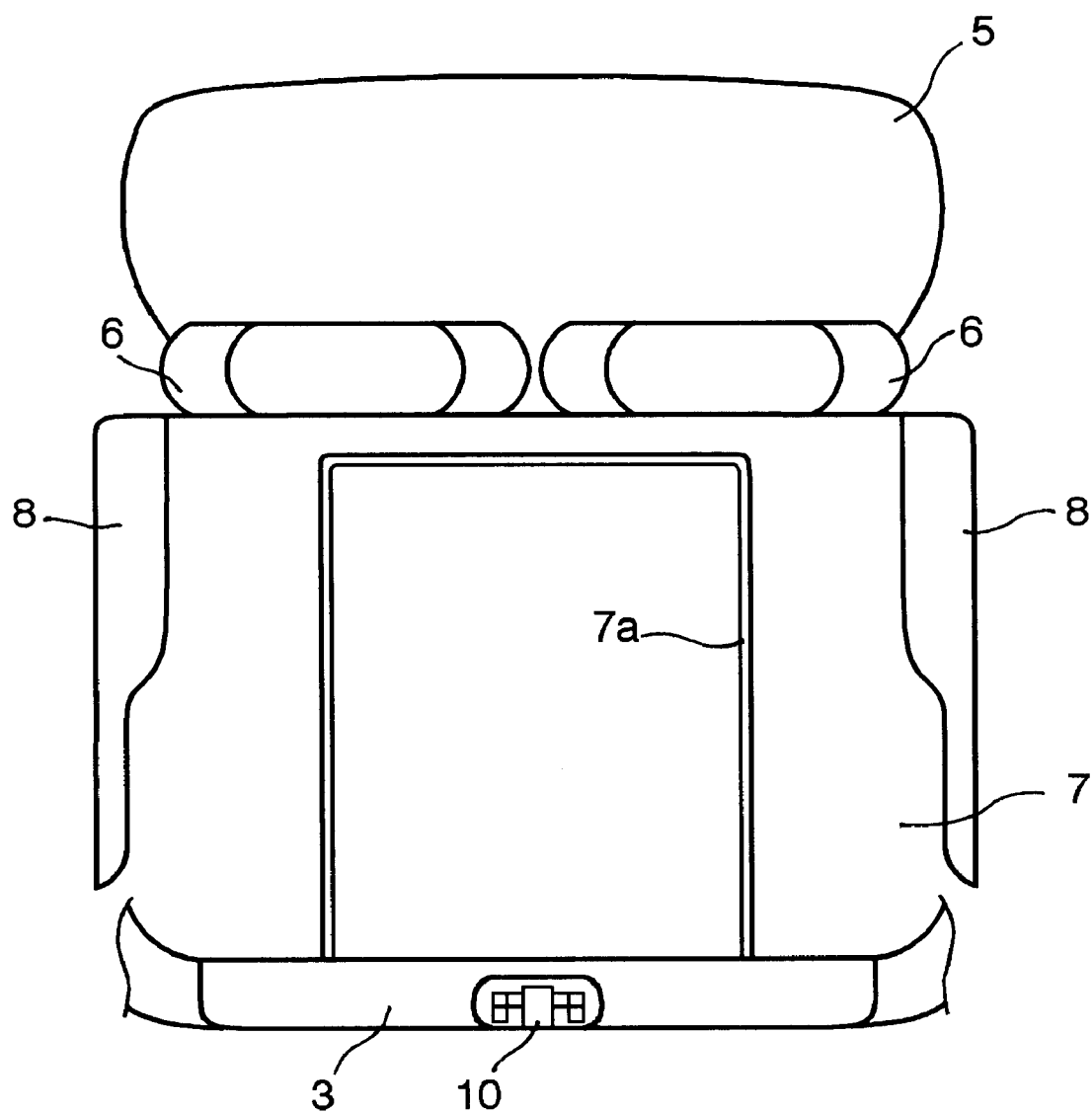
FIG. 4 is a plan view showing the interior of the rear luggage compartment shown in FIGS. 1 and 2.
Figure 5:
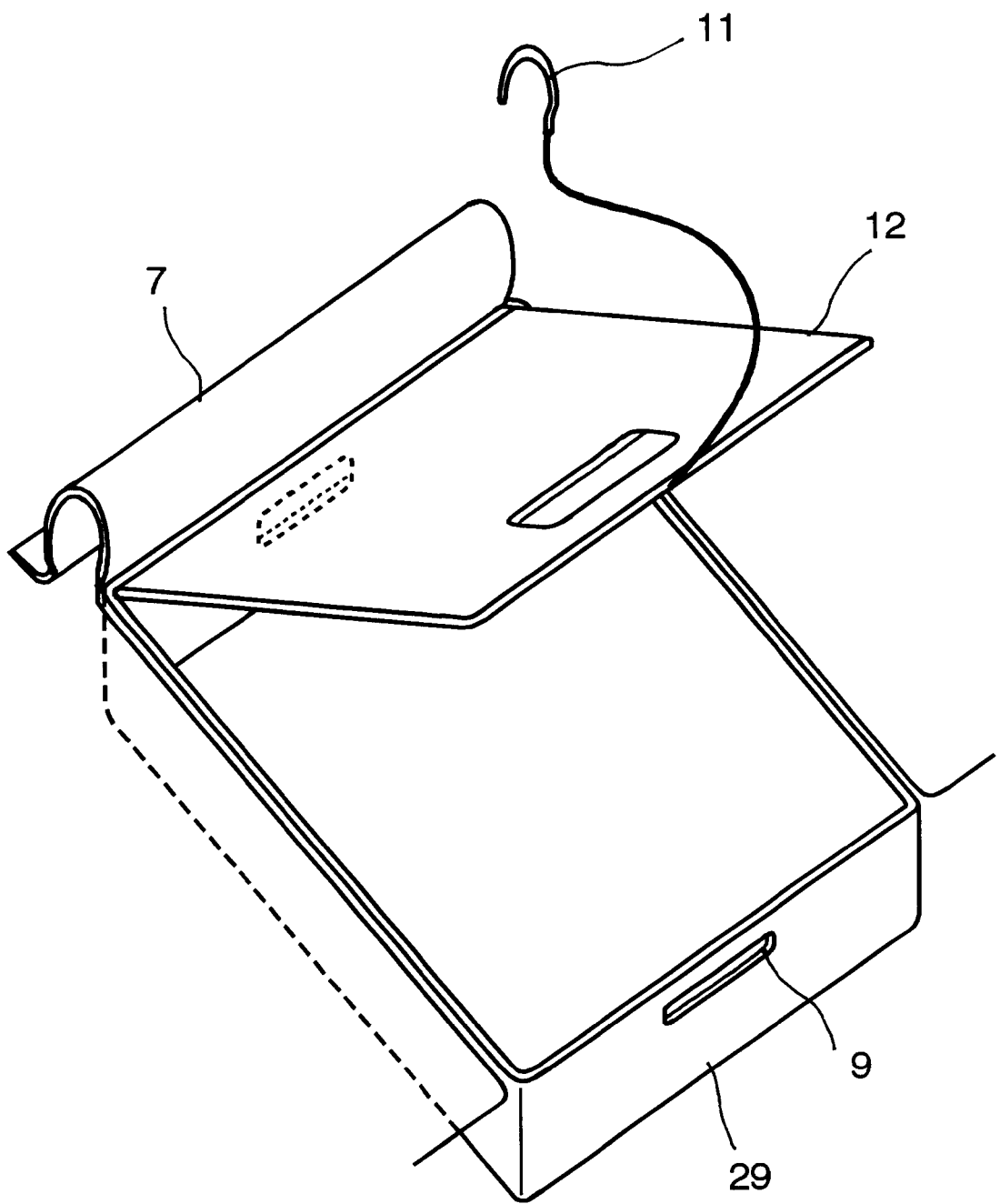
FIG. 5 is a perspective view showing a sub trunk case that is received under the rear luggage compartment shown in FIG. 3.

The following description is directed to the details of a peculiar structure of the rear luggage compartment around the lower trunk case 1 shown in FIGS. 3–5. FIG. 3 is a cross sectional view taken along a line A—A of FIG. 1 showing substantial parts of the structure of the rear luggage compartment of the vehicle body 60 according to a preferred embodiment of the present invention. FIG. 4 is a plan view showing the inside of the rear luggage compartment shown in FIGS. 1 and 2. FIG. 5 is a perspective view showing a box-shaped sub trunk case 29 installed under the rear luggage compartment shown in FIG. 3.

In this embodiment, the vehicle body 60 shown in FIGS. 1 and 2 has first or upper and second or lower rear luggage compartments 60a and 60b behind a rear seat 5 and a rear seatback 6 (see FIG. 4) located in the rear section of the vehicle body 60. That is, the first rear luggage compartment 60a is over a trunk floor mat 7 (at upper side of the vehicle body in the vertical direction) as shown in FIG. 3. The second rear luggage compartment 60b having a deep bottomed configuration is formed by a rear part of a floor panel 14 that is depressed downward as shown in FIG. 3. The box-shaped sub trunk case 29 can be received in and removed from the second rear luggage compartment 60b through access from the first rear luggage compartment 60a. The box-shaped sub trunk case 29 in its completely received position is situated under the trunk floor mat 7.

In this embodiment, the trunk floor mat 7 is formed with a slit 7a as shown in FIG. 4. When a passenger seeks access to the inside of the sub trunk case 29 in order to put luggage in or pick up out of the sub trunk case 29, the passenger pulls up the trunk floor mat 7 surrounded by the slit 7a toward the front of the vehicle body 60 and then swings up a case cover 12 to open as shown in FIG. 5. The case cover 12 can be held in its open position by a hook 11 if necessary. In addition, the sub trunk case 29 is provided with a hand grasp 9 for the purpose of easily pulling out of the second rear luggage compartment 60b as shown in FIG. 5.

The lower trunk case 1, that is provided separately from the vehicle body 60, is arranged as a third rear luggage compartment in the bottom of the depressed floor panel 14. The lower trunk case 1 is situated under the sub truck case 29 received in the second rear luggage compartment 60b as shown in FIG. 3. The lower trunk case 1 in its bottom is provided with rollers 30 mounted to a shaft 30a extending in close proximity to the front end of the lower trunk case 1 on the bottom area of the lower trunk case 1. The floor panel 14 at its upper side is provided with a silicone pad 17 in order to make smooth slide movement of the lower trunk case 1 on the bottom of the depressed part of the floor panel 14. A lock/unlock mechanism, which will be described later, cooperates with the lower trunk case 1 so as to allow the lower trunk case 1 to be pulled out with an intention to make access it from the outside of the vehicle body 60 and to hold it in a completely closed position.

The rear bumper 2 has a bumper reinforcement 20 extending in the transverse direction of the vehicle body 60 and secured to the bumper outer shell 21 via a bumper form 22 made of an elasticity material. A rear end frame 32, which is closed in cross section in the lengthwise direction of the vehicle body 60, is disposed on the front side of the bumper reinforcement 20 and extends in the transverse direction of the vehicle body 60.

As shown in FIGS. 3 and 5, in the status where the sub trunk case 29 is in the closed position, the sub trunk case 29 is constructed such as to be at an approximately same height from the ground as the height of the rear bumper 2 from the ground so that the vehicle body 60 is prevented from a reduction in structural rigidity even though the floor panel 14 is partly depressed downward as described above. Especially, when external impact is applied to the rear bumper 2 from the back, the external impact can be received by the sub trunk case 29 and then be transmitted to the front part of the vehicle body 60 via the sub trunk case 29, so that the external impact applied to the rear bumper 2 can be absorbed to the vehicle body. As a result, the shock absorbing performance of the vehicle body 60 is improved with an effect of enhancing the safety of passengers.

The rear end frame 32 is situated between the bumper reinforcement 20 and the sub trunk case 29 in the closed position, This arrangement transmits an external impact applied to the rear bumper 2 from the back to the bumper reinforcement 20, the rear end frame 32 and the sun trunk case 29 in steps, so that the external impact can be efficiently absorbed to the vehicle body 60, and as a result of which, there is provided improvement of the shock absorbing performance upon an occurrence of a rear of the vehicle body 60 with an effect of improving the safety of passenger.

The lift gate 3 has a typical structure that comprises a lift gate outer frame 19, a lift gate inner support 18 and a door trim 24. The lift gate outer frame 19 is exposed to the outside of the vehicle body 60. The lift gate inner support 18 is joined to the inside of the lift gate outer frame 18. The door trim 24 faces to the first rear luggage compartment 60a. In addition, the floor panel 14 is provided with a cross member 13 having a typical configuration providing reliable body rigidity which is arranged so as to extend in the transverse direction of the vehicle body 60 on a front side of the rear luggage compartment. The lift gate 3 at its lower end is provide with the lock/unlock mechanism 10 that is operative to engage with a striker 23 secured to the rear end frame 32 so as to lock and unlock the lift gate 3. The lock/unlock mechanism 10 is known in various forms and may take any well known form The following description is directed to a mechanism for restricting and allowing sliding movement of the lower trunk case 1 in the lengthwise direction of the vehicle body 60.

Figure 6:
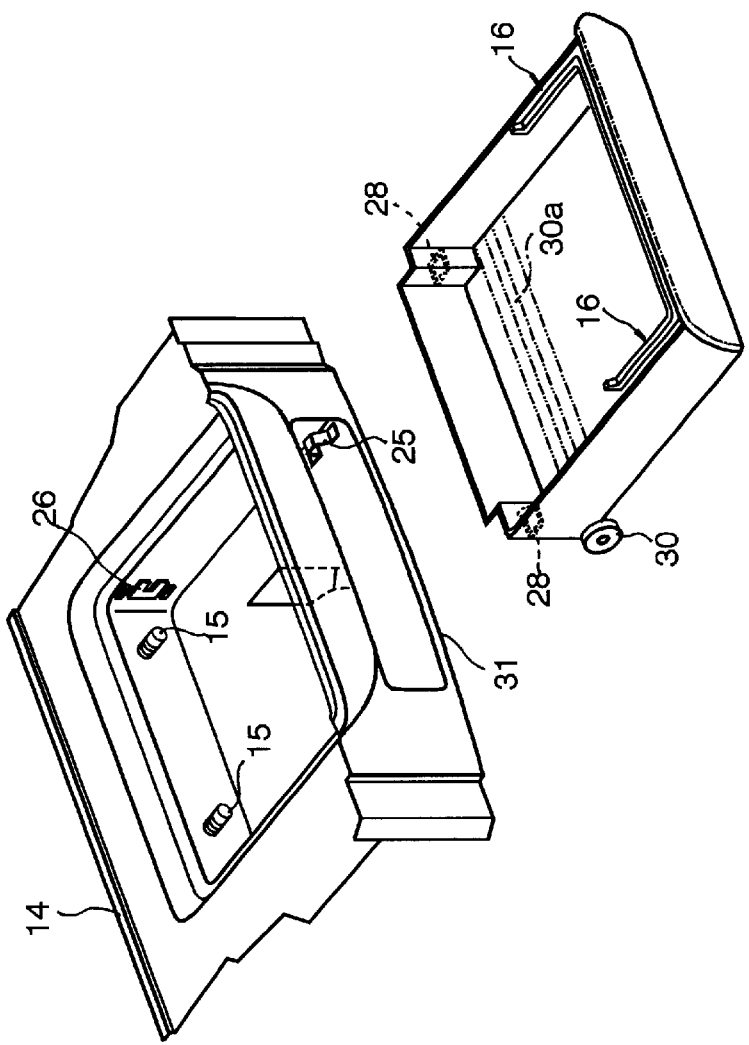
FIG. 6 is a perspective view showing the lower trunk case and a structure for receiving the lower trunk case.
Figure 7:
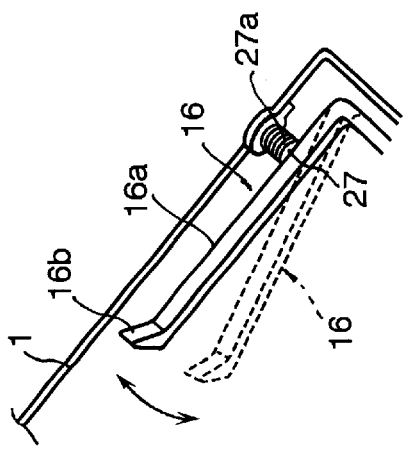
FIG. 7 is a perspective view showing an example of a substantial part of a safety lever that is installed to a rear end of the lower trunk case.
Figure 8:
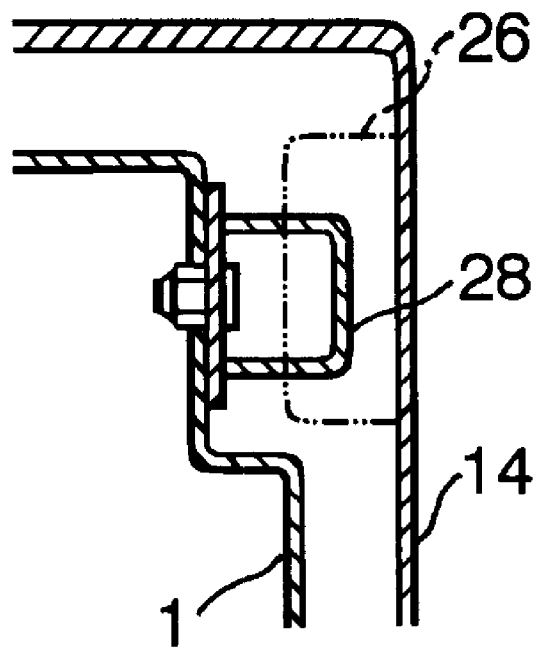

FIG. 6 shows a structure for receiving the lower trunk case 1. FIG. 7 shows a substantial structure of a generally U-shaped safety lever 16 provided on the lower trunk case 1 at a rear part of the vehicle body 60. FIG. 8 shows the lock/unlock mechanism 10 in locked position.

As shown in FIG. 6, a rear end panel 31 is joined to the rear end of the depressed part of the floor panel 14 in a position below the rear end frame 32 (not shown in FIG. 6). This end panel 31 has an aperture through which the rear trunk case 1 pushed in and pulled out. A couple of biasing members 15 are installed to the front side of the depressed part of the floor panel 14 so as to make contact to the front end of the lower trunk case 1 as shown in FIGS. 3 and 6. Each biasing member 15 comprises, for example, a coil spring and a resin member which are configured so as to apply thrust force to the lower trunk case 1 in the closed position. The lock/unlock mechanism comprises first and second lock mechanisms. As shown in FIG. 8, the first lock mechanism, generally designated by a reference numeral 26, can be brought into engagement with strikers 28 secured to opposite rear ends of the lower trunk case 1 to lock or prohibit the lower trunk case 1 from slide movement in the condition where the lower trunk case 1 is applied a force by the biasing members 15 in the closed position as depicted by a solid line in FIG. 3. On the other hand; the lock mechanism 26 is disengaged from the striker 28 to unlock the lower trunk case 1 in order to allow slide movement of the lower trunk case 1 toward the back of the vehicle body 60. The second lock mechanism comprises the generally U-shaped safety lever 16 installed to the rear end of the lower trunk case 1. The safety lever 16 is pivotally mounted on a pivot shaft 27 and biased by a spring 27a mounted on the pivot shaft 27 so as to be forced to a position depicted by a solid line in FIG. 7. In addition, the safety lever 16 has two arms 16a formed with clasping hooks 16b (projections) that extend upward from extreme ends of the arms 16a, respectively.

When the first lock mechanism 26 unlocks the lower trunk case 1, the lower trunk case 1 is forced toward the back of the vehicle body 60 due to restorative force of the biasing members 15. However, the clasping hooks 16b of the safety lever 16 are brought into engagement with a rib 32a extending downward from the rear end frame 32 after a specified distance of movement of the lower trunk case 1, then the lower trunk case 1 is restricted from further slide movement toward the back of the vehicle body 60. In this restricted position, when operating the safety lever 16 so as to bring the clasping hooks 16b into disengagement from the rib 32a of the rear end frame 32 as depicted by a broken line in FIG. 7, the restricted condition is released, so as to allow the passenger to intentionally pull out the lower trunk case 1 further toward the back of the vehicle body. The lower trunk case 1 is placed in condition for access below the rear bumper 2 on the rear side of the vehicle body 60. The lower trunk case 1 thus structured provides access to the inside thereof without opening the lift gate 3 and; therefore, provides enhanced convenience and usefulness.

In this instance, the lower trunk case 1 is constructed such that the pulling out movement of the lower trunk case 1 by the passenger is allowed until a projection (not shown) installed to the lower trunk case 1 engages with a stopper 25 installed to vehicle body 60. However, various stopping mechanisms may be employable for preventing the lower trunk case 1 from slipping off from the vehicle body 60, or otherwise, the lower trunk case 1 may be structured such as to be removed from the vehicle body 60.

Figure 9:
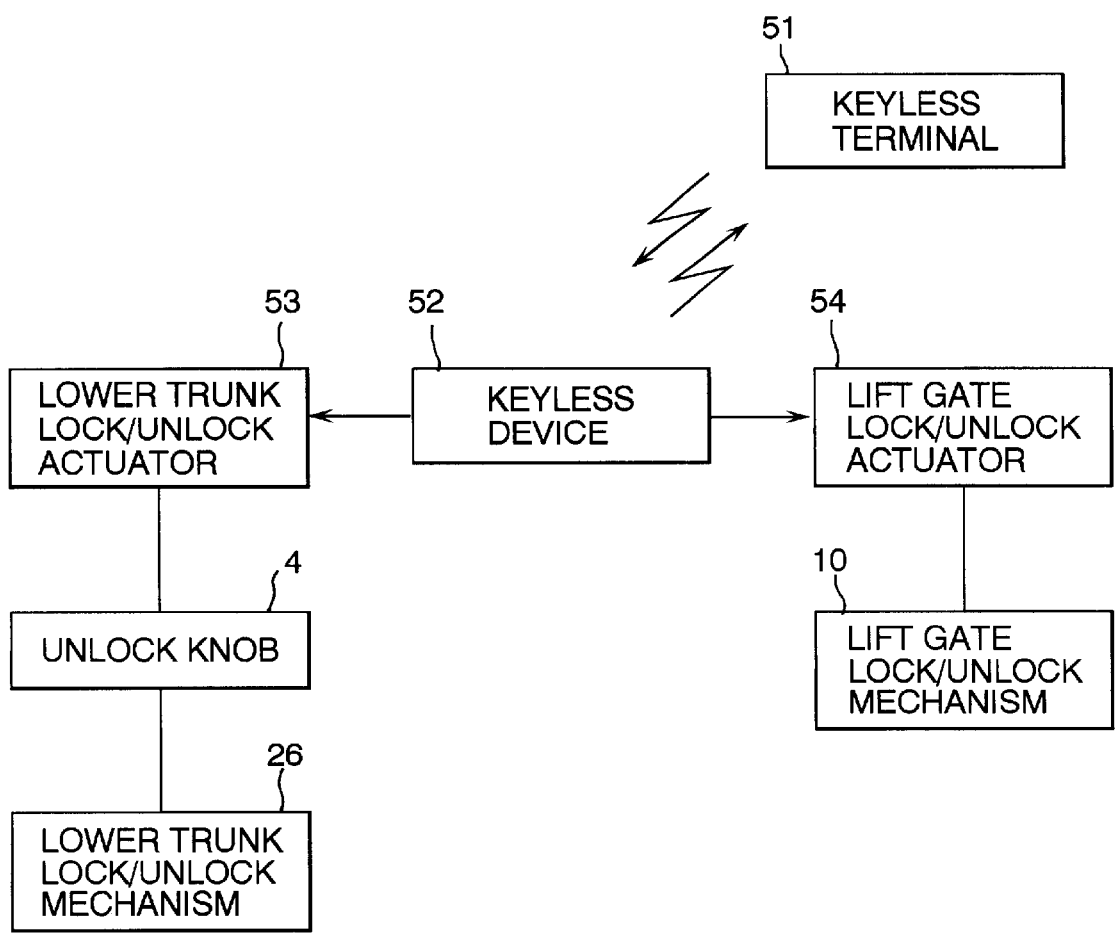
FIG. 9 is a block diagram illustrating a functional structure of control of the lock/unlock mechanisms for a lift gate and the lower trunk case.

FIG. 9 is a functional block diagram for remotely controlling the lock/unlock mechanisms 10 and 26 of the lift gate 3 and the lower trunk case 1, respectively, in the above described embodiment.

Specifically, a keyless terminal 51 can communicate with a built-in keyless device 52 in a well known manner such as infrared communications and radio communications. A lower trunk lock/unlock actuator 53 and a lift gate lock/unlock actuator 54 are connected to the built-in keyless device 52. The lower trunk lock actuator 53 allows or prohibits operation of the lock/unlock knob 4 by the passenger according to operation of the keyless terminal 51 by the passenger. The lift gate lock/unlock actuator 54 maintains or releases the lock status of the lock/unlock mechanism 10 of the lift gate 3 according to operation of the keyless terminal 51 by the passenger. The passenger activates lower trunk lock/unlock actuator 53 by operating the keyless terminal 51 when desiring access to the lower trunk case 1. After the lock/unlock knob 4 is moved to allow operation thereof, manual operation of the lock/unlock knob 4 releases the engagement of the lower trunk case 1 with the lock/unlock mechanism 26, so as to allow the lower trunk case 1 to slide toward the back of the vehicle body 60 as described above.

Due to the lock/unlock mechanism of the lower trunk case 1 and the remote control function of the lock/unlock mechanisms 10 and 26 of the lift gate and the lower trunk case 1 structured as above, the operability and safety of the rear luggage compartment is enhanced.

According to the rear luggage compartment structure of the above embodiment, the lower trunk case 1 is accessible beneath the rear bumper 2 (and hence the bumper reinforcement 22), so that the rear bumper 2 is not necessary to be of a divided structure, and provides the vehicle body 60 with both reliable structural rigidity and improved storage capabilities for luggage. In addition, the lower trunk case 1 is accessible in a lower position as compared to the prior art typical rear luggage compartments, so that the workability for luggage storage by passengers is improved. The storage capacity of the vehicle body 60 is increased due to the provision of the lower trunk case 1 as the third rear luggage compartment in addition to the first rear luggage compartment 60a over the trunk case floor mat 7 and the second rear luggage compartment 60b comprising the sub trunk case 29. This double-stories luggage compartment structure provides multifarious storage-forms of luggage depending upon preference of users. Even though the partly-depressed floor panel 14 is employed, the rear luggage compartment structure can support an external impact applied to the depressed part of the floor panel 14 through the sub trunk case 29 while using the removable sub trunk case 29 received in the second rear luggage compartment 60b, so as to prevent a reduction in structural rigidity of the vehicle body 60.

Furthermore, when using the sub trunk case 29 with the case cover 12 remaining open, bulky luggage can be stored with less chances of falling down or rolling over as compared to the case where only the first rear luggage compartment is used. In addition, when using the rear luggage compartments with the sub trunk case 29 remaining removed (however, this is limited only to the case where the removal of the sub trunk case 29 does not lead to a reduction in structural rigidity of the vehicle body 60), bulky luggage can also be stored with less chances of falling down or rolling over by using the depressed part of the floor panel 14 as a deep luggage compartment in the vehicle direction. This improves the convenience of the rear luggage compartments.

Although, in the embodiment of the present invention described above, the description has been directed to the rear luggage compartment structure of the vehicle body of the type having a rear luggage compartment located behind the rear seat and joining the passenger compartment by way of example, nevertheless, the rear luggage compartment structure of the present invention is not limited to this type of vehicles, but applicable to typical sedan type or three box type of vehicles. Further, the interior configurations of the lower trunk case and the sub trunk case shown in the drawings are depicted in plane form for simplicity. However, the interior configuration is not limited to the plane form, and each of the lower trunk case and the sub trunk case may be provided with a partition and/or formed concavities or projections convexities in the bottom from the view point of practicality and strength.

What is claimed is:

1. A rear luggage compartment structure for a vehicle having a first rear luggage compartment over a rear part of a floor panel of the vehicle body, said rear luggage compartment structure comprising:

the floor panel having the rear part depressed downward so as to form a generally box-shaped second rear luggage compartment below said first rear luggage compartment; and a generally box-shaped trunk case received in said generally box-shaped second rear luggage compartment;

wherein said generally box-shaped trunk case is accessible from said first rear luggage compartment for removal from said second rear luggage compartment.

2. The rear luggage compartment structure as defined in claim 1, further comprising a rear bumper having an outer shell disposed at a rear end of the vehicle body and extending in a transverse direction of the vehicle body, said generally box-shaped second rear luggage compartment being positioned in vertical height so as to place said generally box-shaped trunk case at a same vertical height from the ground as said rear bumper.

3. The rear luggage compartment structure as defined in claim 2, further comprising a bumper reinforcement disposed on a front side of said outer shell of said rear bumper in a lengthwise direction of said vehicle body and a rear end frame disposed between said bumper reinforcement and said generally box-shaped trunk case, said rear end frame extending in said transverse direction and having a cross section closed in said lengthwise direction.

4. The rear luggage compartment structure as defined in claim 1, wherein said rear part of said floor panel is depressed downward so as to form a third rear luggage compartment between said generally box-shaped trunk case received in said second luggage compartment and said rear part of said floor panel depressed downward.

5. The rear luggage compartment structure as defined in claim 4, wherein said third rear luggage compartment is accessible from at least the back of said vehicle body.

6. A rear luggage compartment structure for a vehicle equipped with a rear bumper having an outer shell at a rear end of the vehicle body, said rear luggage compartment structure comprising:

a floor panel having a rear part depressed downward so as to form a rear luggage compartment at a rear part of said vehicle body, wherein said rear luggage compartment is accessible from the back of said vehicle body below said rear bumper.

7. The rear luggage compartment structure as defined in claim 6, further comprising a bumper reinforcement disposed on a front side of said outer shell of said rear bumper in a lengthwise direction of said vehicle body and extending in a transverse direction of said vehicle body, wherein said rear luggage compartment is accessible from the back of the vehicle body below said bumper reinforcement.

8. The rear luggage compartment structure as defined in claim 6, further comprising a partition removably received by said rear luggage compartment so as to divide said rear luggage compartment into upper and lower storage areas.

9. The rear luggage compartment structure as defined in claim 6, further comprising a luggage storage compartment for luggage storage, said luggage storage compartment being separately provided from said vehicle body and being movable in a lengthwise direction of said vehicle body between a closed position where said luggage storage compartment is received by said rear luggage compartment and an open position where said luggage storage compartment is pulled out from said rear luggage compartment, wherein said luggage storage compartment provides external access thereto when moved into said open position.

10. The rear luggage compartment structure as defined in claim 9, wherein said luggage storage compartment has a rear end exposed to the exterior of said vehicle body, said rear end being even and continuous with said outer shell of said rear bumper in said closed position.

11. The rear luggage compartment structure as defined in claim 6, further comprising a first lock/unlock mechanism operative to lock said luggage storage compartment in said closed position and unlock said luggage storage compartment in said closed position so as to allow a specified distance of sliding movement of said luggage storage compartment in said lengthwise direction to said open position and a second lock/unlock mechanism operative to lock said luggage storage compartment so as to hold said luggage storage compartment in said open position and unlock said luggage storage compartment so as to allow further sliding movement of said luggage storage compartment in said lengthwise direction toward the back of the vehicle body beyond said open position.

12. The rear luggage compartment structure as defined in claim 11, wherein said first lock/unlock mechanism comprises means for remotely unlocking said luggage storage compartment.

13. The rear luggage compartment structure as defined in claim 11, wherein said first lock/unlock mechanism comprises means for urging said luggage storage compartment toward said open position while said luggage storage compartment is in said closed position.

14. The rear luggage compartment structure as defined in claim 5, further comprising a trunk case received in said third rear luggage compartment, wherein said trunk case is accessible from the back of said vehicle body for removal from said third rear luggage compartment.

15. The rear luggage compartment structure as defined in claim 14, further comprising a lock/unlock mechanism operative to lock said trunk case in said third luggage compartment and unlock said trunk case in said third luggage compartment so as to as to allow said trunk case to be pulled out in said lengthwise direction for direct access to the interior of said trunk case.

* * * * *